United States Patent [19]

Magnus

[11] Patent Number: 4,521,611

[45] Date of Patent: Jun. 4, 1985

[54] POLYESTER POLYOL BLEND FROM PHTHALIC ANHYDRIDE BOTTOMS

[75] Inventor: George Magnus, Arlington Heights, Ill.

[73] Assignee: Stepan Chemical Company, Northfield, Ill.

[21] Appl. No.: 507,532

[22] Filed: Jun. 27, 1983

Related U.S. Application Data

[63] Continuation-in-part of Ser. No. 381,298, May 24, 1982, abandoned.

[51] Int. Cl.$^3$ .................. C07C 69/80; C07C 69/76
[52] U.S. Cl. .................................. 560/91; 524/605; 528/83; 560/89
[58] Field of Search .............. 560/89, 91; 524/605; 528/83

[56] References Cited

U.S. PATENT DOCUMENTS

| | | | |
|---|---|---|---|
| 3,459,733 | 8/1969 | Byrd et al. | 560/89 X |
| 3,505,377 | 4/1970 | Morehouse | 560/89 X |
| 3,563,924 | 2/1971 | Schwarz | 528/83 X |
| 4,018,815 | 4/1977 | Vogt et al. | 560/89 X |
| 4,039,487 | 8/1977 | Kolakowski | 528/83 X |
| 4,246,365 | 1/1981 | Wiedermann et al. | 521/172 |
| 4,347,330 | 8/1982 | Demou et al. | 521/110 |

OTHER PUBLICATIONS

H. E. Reymore, R. J. Lockwood, and H. Olrich entitled "Novel Isocyanurate Foams Containing No Flame Retardant Additives", Journal of Cellular Plastics, (Nov./Dec. 1978), pp. 332–340.

*Primary Examiner*—Natalie Trousof
*Assistant Examiner*—Vera C. Clarke
*Attorney, Agent, or Firm*—Hill, Van Santen, Steadman & Simpson

[57] ABSTRACT

A new and highly useful complex mixture of polyester polyols is prepared by esterifying phthalic anhydride bottoms with aliphatic polyols. This mixture can be reacted with organic isocyanates in the presence of fluorocarbon blowing agent and preferably catalysts to produce cellular polymeric structures.

3 Claims, No Drawings

POLYESTER POLYOL BLEND FROM PHTHALIC ANHYDRIDE BOTTOMS

RELATED APPLICATION

This application is a continuation-in-part of my earlier filed U.S. application, Ser. No. 381,298, filed May 24, 1982, now abandoned.

BACKGROUND OF THE INVENTION

1. Field of the Invention

This invention lies in the field of polyester polyol compositions, and techniques for making the same.

2. Description of the Prior Art

Cellular polyurethane and polyisocyanurate polymers are well known to the art particularly for use in various types of thermal insulating applications. Such polymers are manufactured by reacting polyfunctional organic isocyanates with polyfunctional compounds containing free hydroxyl groups (e.g., polyols) in the presence of a blowing agent and (usually) a catalyst.

Because of the relative high cost of polyols useful in making cellular polymers, and because of property problems (such as friability, flammability, and blend compatibility, and the like), efforts have been made heretofore to find polyols adapted for chemical conversion into such cellular polymers which are as low cost as possible. Because of a tendency for lower cost polyols to produce product foams of less than desired properties, it has become commonplace to prepare and utilize blends of different polyols for reaction with organic polyisocyanates to produce product foams having desired combinations of properties. Through the use of carefully prepared and formulated resin precursor blends containing polyols which are then reacted with isocyanates, product foam problems can be avoided, such as lack of uniform core strength or core density, poor adhesion between foam core and adjacent substrate, excessive foam friability, and the like.

Aliphatic alcohol esters of phthalic acid are known (see Kessler et al. U.S. Pat. No. 1,714,173), and efforts have heretofore been made to employ at least one member of this class (diethylene glycol phthalate) as a polyol in the manufacture of cellular polymers; see, for example, the article by Reymore et al. entitled "Novel Isocyanurate Foams Containing No Flame Retardant Additives" in Journal of Cellular Plastics November/December 1978, pages 332–340.

It now appears that if phthalate polyester polyol compositions could be prepared and if such phthalic acid ester polyols could be prepared at low cost, then such compositions could and would have significant commerical value, particularly as additives to resin blends of the type adapted for reaction with organic isocyanates.

SUMMARY OF THE INVENTION

The present invention concerns a new and very useful mix of aromatic ester polyols which are useful as intermediates for reaction with isocyanates to produce cellular polyurethane and polyisocyanurate polymers, and to a process for making such ester polyol compositions from phthalic anhydride bottoms.

The ester polyol compositions of the present invention are produced by reacting at least one so-called phthalic anhydride bottom composition with at least one polyol of the formula:

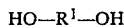

wherein:
$R^1$ is a divalent radical selected from the group consisting of:
(a) alkylene radicals each containing from 2 through 6 carbon atoms,
(b) radicals of the formula:

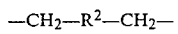

$R^2$ is a radical selected from the group consisting of:

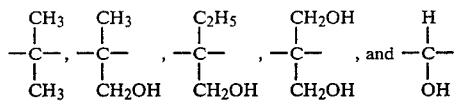

(c) radicals of the formula:

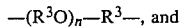

and $R^3$ is an alkylene radical containing from 2 through 3 carbon atoms and
n is an integer of from 1 through 3.

Preferred polyols of formula (1) are polyether glycols or mixtures of polyether glycols with other polyols of formula (1).

Examples of suitable polyol starting materials include one or more of the following: glycerine, ethylene glycol, diethylene glycol, propylene glycol, dipropylene glycol, trimethylene glycol, butylene glycols, 1,1,1-trimethylolethane, 1,1,1-trimethylolpropane, pentaerythritol, and poly(oxyalkylene) polyols in which each repeating unit contains two or three carbon atoms such a polyol being derived by the condensation of ethylene oxide, and propylene oxide, and combinations thereof. As those skilled in the art will appreciate, in the preparation of mixed poly(oxyethylene-oxypropylene) polyols, the ethylene and propylene oxides may be added to a starting hydroxyl-containing reactant either in admixture or sequentially. A presently most-preferred polyol for reaction with phthalic anhydride bottoms starting material is diethylene glycol.

Although phthalic anhydride bottoms comprise mainly phthalic anhydride, the remaining components of the phthalic anhydride bottoms appear to contain components which react with a polyol of formula (1) presumably to produce ester byproducts, although the exact composition of the starting phthalic anhydride bottoms and consequently of the reaction product of a polyol of formula (1) and a phthalic anhydride bottoms is at this time not known.

It is surprising and unexpected fact that, despite the complex and unknown nature of the composition produced by reacting as taught herein phthalic anhydride bottoms with a polyol for formula (1), there is produced a product which can be readily and simply utilized for reaction with isocyanate to produce polyurethane foams and polyisocyanurate foams which have properties that appear generally to be equal to the properties of corresponding foams made with esters produced by reacting substantially pure phthalic anhydride with polyol of formula (1). Such results are particularly surprising and unexpected since one skilled in the art would normally expect that the complex mixture of components present in a product of the present invention would tend to be more difficult to formulate than relatively pure esters of polyols of phthalic acid (or anhydride), and one so skilled would also normally expect that product foams similarly so produced would tend to have characteristically generally poorer properties than such corresponding foams produced from such pure phthalate esters.

A particular advantage of the present invention is that there is now provided a technique for converting phthalic anhydride bottoms, which were heretofore generally regarded as useless, into commercial products having a significant value, thereby not only avoiding environmental pollution and waste product disposal problems, but also providing for the foam art a new class of starting materials which can be produced at very low cost (relative to the cost of many known polyols heretofore employable in the manufacture of polyurethane and polyisocyanurate foams).

The phthalate ester containing compositions of the present invention appear to have excellent shelf life stability characteristics and isocyanurate foams can be produced from such ester compositions which appear to have excellent class ratings as regards flame retardance and flammability characteristics.

Other and further objects, advantages, aims, features and the like will be apparent to those skilled in the art from the teachings of the present specification taken with the claim.

DETAILED DESCRIPTION

Phthalic Anhydride Crude, Bottoms and Light Ends

The phthalic anhydride bottoms used as a starting material in the practice of the present invention result from the process of converting o-xylene to phthalic anhydride. This process is carried out by the sequential steps of:

(A) contacting in the presence of excess oxygen (air) o-xylene of at least about 95 weight percent purity (on a total starting feed basis) with (preferably) a vanadium catalyst under vapor phase conditions involving a temperature ranging from about 360° to 400° C., and a pressure ranging from about 0 to about 10 psig, which conditions are maintained for a time sufficient to convert theoretically at least about 96 weight percent of the total starting o-xylene to phthalic anhydride;

(B) desubliming the vapor phase product stream from the above contacting to produce a solid material at a temperature typically ranging from about 50° to 70° C. under about atmospheric pressure, (C) first heating the solid so produced by the above subliming to a temperature not less than about 130° C. which temperature is at least sufficient to liquify such solid at about atmospheric pressure;

(D) secondly heating the liquid so produced in such first heating to a temperature ranging from about 270° to 295° C. for a time at least sufficient to convert at least about 99 weight percent of all phthalic acid material in such liquid into phthalic anhydride;

(E) first distilling the resulting liquid from such second heating at a vapor phase temperature ranging from about 220° to 240° C. while maintaining an absolute pressure in the range from about 250 to 150 mm Hg and collecting and condensing substantially all such first distillate so produced, the first raffinate being so produced from such first distilling being maintained at a temperature ranging from about 240° to 260° C.; and (F) secondly distilling such first raffinate at a vapor phase temperature ranging from about 240° to 260° C. while maintaining an absolute pressure in the range from about 250 to 350 mm Hg and collecting and condensing substantially all such second distillate so produced, the second raffinate being so produced in such second distilling being maintained initially at a temperature ranging from about 260° to 280° C.

The first distillate so produced is known as "light ends" or "phthalic anhydride light ends", while the second distillate so produced comprises substantially pure phthalic anhydride. The second raffinate so produced is known as "bottoms" or "phthalic anhydride bottoms". The resulting liquid from the first heating is known as "crude" or "phthalic anhydride crude". The first and the second distilling steps, respectively, can each be carried out either batchwise or continuously, as those skilled in the art appreciate. The crude, the light ends, and the bottoms can each be regarded as having a somewhat variable composition, such compositional variations theoretically being the result of variations in the starting o-xylene feed, and also of variations in the exact conditions employed for the respective process steps.

As those skilled in the art will appreciate, in a typical actual commercial-scale phthalic anhydride production plant, the process parameters are so regulated that the composition of a phthalic anhydride bottoms (second raffinate) falls into a desired or preset range for a constant feedstock of o-xylene.

Therefore, it is very difficult to state the exact compositions of, respectively, all possible crude, light ends and bottoms. Nevertheless, the respective characteristic compositions of light ends and bottoms are now believed to be distinctly different from one another. For example, a typical phthalic anhydride crude composition is now believed to be as follows (on a 100 weight percent total composition basis):

| component | weight percent |
| --- | --- |
| (1) phthalic anhydride | 96–99 |
| (2) trimellitic acid and/or acid anhydride | 0.2–0.3 |
| (3) benzoic acid and/or acid anhydride | 0.1–0.2 |
| (4) other components | balance to 100% |

Similarly, and for example, a typical phthalic anhydride light ends composition is now believed to be as follows (on a 100 weight percent total composition basis):

| component | weight percent |
| --- | --- |
| (1) phthalic anhydride | 45–90 |
| (2) benzoic acid or benzoic acid anhydride | 7–42 |
| (3) maleic acid or maleic acid anhydride | 3–13 |
| (4) other components | less than 1.0% |

Similarly, and for example, presently preferred and more preferred bottoms compositions which are suitable for use as starting materials in the practice of the present invention are shown in Table I below (based on presently available information concerning phthalic anhydride bottoms compositions):

TABLE I

Phthalic Anhydride Bottoms

| Component or Property | Preferred | More Preferred |
|---|---|---|
| I. Component (100 wt % basis) | | |
| (1) phthalic anhydride | 50-95 | 60-95 |
| (2) trimellitic acid and/or trimellitic acid anhydride | 1-20 | 1-13 |
| (3) anthraquinone | — | 0.5-4 |
| (4) isophthalic acid and/or isophthalic acid anhydride | — | 0.3-2 |
| (5) unknown acetone insolubles[1] | 3-40 | 8-30 |

Table I footnotes:
[1]Percent acetone insolubles refers to the percentage by weight of a sample that is sufficiently insoluble in acetone to allow such to be removed by suction filtration. Weight percent is calculated as the difference between the sample weight and the weight of the residual material after evaporation of the acetone from the filtrate. (This represents the soluble material and any difference from the starting sample weight is the weight of the insoluble material.)

Thus, characteristically, phthalic anhydride light ends contain mainly phthalic anhydride plus benzoic acid or benzoic acid anhydride, plus maleic acid anhydride (or maleic acid); characteristically, phthalic anhydride bottoms contain mainly phthalic anhydride, trimellitic acid and/or trimellitic anhydride, plus unknown insolubles; and, characteristically, phthalic anhydride crude contains phthalic anhydride, phthalic acid, trimellitic acid (and/or trimellitic anhydride), plus benzoic acid (and/or benzoic anhydride).

In actual commercial practice, it is believed that, in a phthalic anhydride bottoms composition, the quantity of phthalic anhydride present can range from a low of 10 weight percent to a high of about 96 weight percent on a 100 weight percent basis, with the balance up to 100 weight percent thereof in any given such bottoms composition being mainly trimellitic acid and/or trimellitic anhydride plus unknown insolubles. The amount of phthalic anhydride in a phthalic anhydride bottoms composition is dependent on the discretion of the manufacturer as to the amount of phthalic anhydride removed during distillation from the first raffinate.

If it is desired to consume a crude, pure, and/or light ends composition, or mixture thereof, in the practice of the present invention, such can be added to a given starting phthalic anhydride bottoms composition, but it is presently preferred in such a composite starting composition system to maintain a weight ratio of phthalic anhydride to trimellitic acid and/or trimellitic anhydride such as is shown in the phthalic anhydride bottoms composition above characterized in Table I.

Esterification

A starting phthalic anhydride bottoms composition such as characterized in Table I above to be esterified in accord with this invention is selected which in addition also has the characteristics shown in Table II below:

TABLE II

| Characteristic | Broad Range | Preferred Range |
|---|---|---|
| hydroxyl number[1] | nil | nil |
| acid number[2] | about 380-750 | about 500-700 |

Table II footnotes:
[1]The term "hydroxyl number" is defined as the number of milligrams of potassium hydroxide required for the complete neutralization of the hydrolysis product of a fully acetylated derivative prepared from one gram of a polyol or a mixture of polyols. The term "hydroxyl number" is also defined by the equation:

$$(2) \quad OHV = \frac{56.1 \times 1000 \times F}{M.W.}$$

wherein:
OHV is the hydroxyl number (of the polyol or polyol blend),
F is the average functionality (i.e., the average number of active hydroxyl groups per molecule of the polyol or polyol blend), and
M.W. is the average molecular weight of the polyol or polyol blend.

[2]The term "acid number" is defined by the number of milligrams of potassium hydroxide required to neutralize the acid material present in one gram of sample.

Typically, after an esterification is completed, a product contains excess residual unreacted formula (1) polyol in an amount ranging from 2 to about 35 weight percent, based on total product weight, though a given product can contain larger quantities of such formula (1) polyol excess. If a quantity of excess formula (1) polyol below about 5 to 10 weight percent is desired in a given product, one may use nitrogen sparging during the esterification to remove unreacted formula (1) polyol.

Such a starting phthalic anhydride bottoms composition is admixed with at least one polyol of formula (1) above to produce an initial mole ratio of said polyol(s) to said phthalic anhydride bottoms composition in the range from about 2 to 4 based on an estimate of the total content of carboxylic acid and carboxylic acid anhydride species in a given starting phthalic anhydride bottoms composition.

Since a presently preferred starting phthalic anhydride bottoms composition is characteristically a solid at ambient temperatures, the mixing of polyol of formula (1) with starting phthalic anhydride bottoms composition is preferably carried out with such bottoms composition in a liquid (heated) state. Particularly to avoid wasting energy, a presently preferred mixing temperature being in the range from about 150° to 250° C., although somewhat higher or lower such mixing temperatures can be used as desired.

In plant operating conditions, and for energy conservation reasons, a preferred operating procedure in accord with the present invention involves transferring a given phthalic anhydride bottoms composition in a heated condition from the production zone to either an intermediate heated holding tank (or zone) or directly to an esterification reactor (or reaction zone) wherein mixing with polyol and mixture heating can be carried out to practice an esterification in accord with this invention.

A given mixture of starting phthalic anhydride bottoms composition and polyol of formula (1), for esterification to occur, is heated with mixing at a temperature ranging from about 150° to 250° C. (preferably from about 210° to 240° C.) under liquid phase conditions. This heating or contacting between polyol of formula (1) and starting phthalic anhydride bottoms composition is continued until a desired extent of esterification (reaction) has been achieved. Preferably such heating is continued until the resulting product mixture reaches an hydroxyl number ranging from about 190 to 600 and an acid number ranging from about 0.01 to 7, and more preferably until such reaches an hydroxyl number ranging from about 270 to 450 and an acid number ranging from about 2 to 6. A desired hydroxyl value is achieved by adding to, or removing from, the reaction mixtures polyol of formula (1). Typical contacting (esterification) times range from about 3 to 12 hours. Higher contacting temperatures usually produce lower contacting times.

Table III (below) summarizes contacting (esterification) conditions:

TABLE III

Contacting (Esterification) Conditions

| Condition | Preferred | More Preferred |
|---|---|---|
| (1) initial mole ratio (polyol to bottoms) | 2 to 4 | — |
| (2) temperature | 150–250° C. | 210–240° C. |
| (3) liquid phase | yes | yes |
| (4) typical contacting times | 3–12 hours | 4–8 hours |

The esterification reaction used for producing an ester polyol blend product of this invention may, if desired, be carried out in the presence or absence of a catalyst, as those skilled in the art will appreciate. Suitable catalysts include organotin compounds, particularly tin compounds of carboxylic acids, such as stannous octoate, stannous oleate, stannous acetate, stannous laurate, dibutyl tin dilaurate, and other such tin salts. Additional suitable catalysts include metal catalysts, such as sodium and potassium acetate, tetraisopropyl titanates, and other such titanate salts, and the like.

Ester Polyol Composition

Such an esterified product of this invention after cooling is found to be a complex mixture of ester polyols of generally undetermined composition, but the characteristically predominant component in any given such product is believed to be at least one diester of phthalic acid with starting polyol of formula (1). Typically, the product ester polyol composition is, at room or ambient temperatures and pressure, in the physical form of a dark colored liquid or gel-like material which appears to be indefinitely stable. In general, the process conditions and the starting materials are selected so as to produce a liquid or gel product ester polyol composition which is characterized by having:

(a) a hydroxyl number in the range from about 200 to 600, (b) a content of esters from the reaction of phthalic anhydride and starting formula (1) polyol ranging from about 40 to 85 weight percent (100 weight percent total product composition basis), and (c) a content of acetone insolubles ranging from about 7.0 to 45 weight percent (100 weight percent total product composition basis).

Table IV (below) summarizes product ester polyol composition characteristics:

TABLE IV

Ester Polyol Product Characteristics

| Component or Property | Weight Percent[7] or Property Value | |
|---|---|---|
| | Preferred | More Preferred |
| I. Component (100 wt % basis) | | |
| (1) content of unreacted polyol of formula (1)[1] | 2–35 | 8–30 |
| (2) content of acetone insolubles[2] | 7.0–45 | 7.0–35 |
| (3) content of esters produced by reaction of carboxylic with polyol of formula (1) | 40–85 | 50–85 |
| II. Property | | |
| (4) hydroxyl number[3] | 190–600 | 270–480 |
| (5) acid number[4] | 0.01–7 | 2–6 |
| (6) saponification value[5] | 295–425 | 350–400 |
| (7) viscosity[6] | 10,000–150,000 cps | 25,000–100,000 cps |

Table IV footnotes:
[1] Gas chromatography is utilizable in determining the free (unreacted) polyol content of a product of this invention. For example, a silica based column (e.g., a UCW 98 6′ × ⅛″ column) is employable using isothermal conditions of 150° C. to achieve a separation. An external standard of a particular glycol, such as the preferred diethylene glycol, is used as a basis for quantitation.
[2] Weight percent of active insolubles is measured as described in footnote 1 of Table I (above).
[3] Hydroxyl number is measured as described in footnote 1 of Table II (above).
[4] Acid number is measured as described in footnote 2 of Table II (above).
[5] The term "saponification value" is identified by the number of milligrams of potassium hydroxide required to react with the ester groups present in one gram of sample. To determine saponification value, the American Chemist's Society Offical Method No. C-d-3-25 is employed.
[6] Viscosity is measured at 25° C. by using a Brookfield viscometer (model RVF) with a #6 spindle operating at 10 rpm.
[7] The composition of an ester polyol product of this invention is not presently known on a 100 weight percent total basis. The component contents shown in this Table are therefore not intended to, and probably do not in fact account for, the total composition of a given such product.

Apparently because of the unknown compositional characteristics of phthalic anhydride bottoms, and because of the likelihood that compositional variations can occur from one batch of phthalic anhydride bottoms to another, generalizations about product ester polyol compositions of this invention are difficult to make. The following observations are offered in good faith based on available information and observations:

(1) Viscosity appears to increase as the quantity of formula (1) polyol decreases (owing to reaction with carboxylic moieties or to removal by distillation, or the like).

(2) Hydroxyl number appears to decrease as the quantity of formula (1) polyol decreases.

(3) Saponification values appear to be roughly correlatable with content of unknown acetone insolubles.

Resin Blends

A product ester polyol composition of this invention is blendable with other polyols [preferably those of formula (1)] such as those used in the prior art as reactants with isocyanates to produce liquid precursor resin blends employable for reaction with isocyanates to produce polyurethane and/or polyisocyanurate foams. In general conventional methods of resin blend preparation well known to those in the art of such manufacture can be employed.

Aliphatic fluorocarbons of the type used as blowing agents in making such foams characteristically appear to be only slightly soluble in such a product, indicating that preferably a compounding of such a product ester polyol composition with such aliphatic fluorocarbons should be carried out to produce a miscible, or compatible, homogenous blend of these respective materials when such blend is being used as a liquid precursor resin blend for reaction with isocyanates to produce such foams.

As indicated above (see Table IV), unexpectedly, it appears to be advantageous for a product ester polyol composition of this invention to contain unreacted (excess) polyol of formula (1) above. The quantity of the excess used in any given instance appears to be dependent upon the effects or results desired (as in a resin blend prepared from a product composition of this invention) so that the exact amount is thus a choice of the user. The presence of such an excess appears to have various beneficial effects. For one thing, the compounding of a product ester polyol composition into a resin blend containing a fluorocarbon blowing agent, such as can be accomplished when formulating a product ester polyol composition of this invention to be used for subsequent reaction with an isocyanate in the presence of a catalyst to produce a product foam, appears to be beneficial because such formula (1) polyol excess may exerts a compatibilizing effect between the fluorocarbon blowing agent and the product ester polyol composition (wherein the fluorocarbon blowing agent appears to be soluble or compatible only to a limited extent without the presence of some sort of compatibility agent). For another thing, the reactivity of (a) such a formulated resin blend of product ester polyol composition with excess polyol of formula (1) and (6) a conventional organoisocyanate, in the presence of a catalyst, especially a conventional trimerization catalyst of the type used to make polyisocyanurate foams, appears to be accelerated by the presence of such an excess, as demonstrated, for example, by a characteristically shorter initial cream time and a shorter tack free time in a foaming and freshly foamed cellular products, as compared to, for example corresponding respective such times associated with a corresponding reaction of a formulated resin blend of product ester polyol composition that contains very little, or even substantially no, excess formula (1) polyol. For still another thing, the cellular product formed from reaction of such a formulated resin blend containing excess formula (1) polyol and conventional isocyanate (in the presence of catalyst, especially a conventional trimerization catalyst) appears to have a better blush and a reduced friability, compared to, for example, corresponding cellular product produced with formulated resin blend of product ester polyol composition that contains very little, or even substantially no, excess formula (1) polyol. For still another thing, the ambient temperature fluidity of a product ester polyol composition seems to be improved, and the liquid viscosity thereof lowered, by the presence of excess formula (1) polyol in combination therewith which permits ready and convenient blending of such a composite composition with other ingredients to produce a resin blend. The reasons for these various beneficial effects are not definitely known or understood at this time.

The quantity of such an excess of formula (1) polyol used in combination with product ester polyol composition which produces such a beneficial effect as above indicated presently appears to be preferably in the range from about 2 to about 35 weight percent based on 100 weight percent combined or composite composition of a product ester polyol composition and excess of at least one formula (1) polyol, though larger and smaller amounts of such a formula (1) polyol excess can be employed, if desired. The quantity of excess unreacted polyol formula(s) present in a product ester polyol composition of this invention can be estimated by any convenient procedure. One presently preferred procedure is to employ gas chromatography. The difference between the amount of unreacted polyol (e.g., of formula (1) and the balance up to 100 weight percent of any given ester polyol composition of this invention can be used conveniently as an estimate for the actual amount of reacted product [formula (1) polyol with phthalic anhydride bottoms composition] of this invention.

As used herein, this term "initial cream time" has reference to the time required for foaming to commence in a fully mixed system of resin blend and isocyanate (including catalyst) using starting materials at 25° C.

Similarly, the term "tack free time" has reference to time required from initial mixing for a foam to achieve a condition such that an exposed surface thereof is tack free when contacted lightly by a human finger or the like.

Similarly, the term "blush" has reference to the visual or optical appearance of the surface of a foam after total foam rise and achievement of tack free time.

Similarly, the term "friability" has reference to the condition of the surface of a foam which has achieved a total foam rise and a tack free condition, as determined by moving a human finger or the like over such surface and visually observing whether crumbling or crushing of such surface is observed and, if so, the approximate extent thereof.

The combination of such an excess of formula (1) polyol with product ester polyol composition appears to cause an elevation of the hydroxyl number associated with such a composite composition, and such increase in hydroxyl number is generally directly proportional to the quantity of such excess present. The type of formula (1) polyol and the quantity of the excess thereof present may influence the first value of the hydroxyl number existing in any given composite product ester polyol composition. Owing to the possible compositional variations in product composite ester polyol composition, it is not presently possible to provide information about exact quantities of product ester polyol composition and of formula (1) polyol which will produce a given hydroxyl number.

However, and for example, in the case of a preferred product ester polyol composition prepared by using a preferred phthalic anhydride bottoms composition, and, as the formula (1) polyol, diethylene glycol, and by using preferred esterification conditions as herein taught, it is observed that the hydroxyl number of such product composite composition appears to be elevated by about 10 for each 1 weight percent of added or excess diethylene glycol on a total product composition weight percent basis. Also multifunctional (polyhydroxylated) polyols of formula (1) appear to elevate the hydroxyl number of a product ester polyol composition at a faster rate per quantity there present than is associated with dihydroxylated polyols of formula (1). Presently available information suggests that the hydroxyl number of a product composite composition is preferably kept below about 380, especially when the manufacture of polyisocyanurate foams is contemplated therefrom, but composite compositions having higher hydroxyl numbers can be prepared and utilized to make resin blends, if desired, as those skilled in the art will appreciate.

At the present time, no means is known for quantitatively correlating the hydroxyl number of a composite composition with one or more of the beneficial effects above described; the number of variables involved apparently makes such a generalization exceedingly difficult, if not impossible, to achieve.

For a given formulated resin blend containing product ester polyol composition with excess formula (1) polyol (particularly diethylene glycol), available data indicates that when the hydroxyl number is within the preferred range of 270 to 480, the resin blend will produce a desirable or useful combination of beneficial effects, such as those described above. By simple conventional experimentation, those skilled in the art can and will routinely correlate for a particular system the hydroxyl number of a composite resin blend composition with such beneficial effects.

For example, one presently preferred class of resin blends produced from more preferred product ester polyol compositions of the present invention using diethylene glycol as the formula (1) polyol is characterized by having the following formulation:

TABLE V

| Component[1] | Preferred (100 wt % basis) |
|---|---|
| (1) more preferred product ester polyol composition as shown in Table IV[2] | 25–50 |
| (2) total content of unreacted diethylene glycol[3] | 2–35 |
| (3) fluorocarbon (low molecular weight fluorinated alkane) | 25–40 |
| (4) ethoxylated alkyl phenol | 5–20 |
| (5) dimethylpolysiloxane polyalkylene oxide copolymer | 0.5–3 |
| (6) polyisocyanurate catalyst | 1–7 |
| (7) flame retardant | 0–15 |
| (8) ethoxylated cocoamine[4] | 0–20 |

Table V Footnotes:
[1]The individual components are preferably so selected that a product resin blend has an hydroxyl number preferably ranging from about 100 to 300 and a viscosity preferably ranging from about 100 to 3000 centipoises (both measured as herein above described).
[2]Calculated as difference from gas chromatographic analysis of unreacted polyol content of a polyester polyol product composition of this invention.
[3]Includes unreacted polyol present in a product polyester polyol composition plus added polyol.
[4]Usually used in an amount ranging from about 1.5 to 12 weight percent.

EMBODIMENTS

The following examples are merely illustrative of the present invention and are not intended as a limitation upon the scope thereof.

EXAMPLE 1

A specimen of a phthalic anhydride bottoms composition is obtained having:
(a) a phthalic anhydride content of about 60 weight percent (total composition basis),
(b) a hydroxyl number estimated to be about 0, and
(c) an acid number estimated to be about 500–700, and wherein the other components are believed to be within the ranges for a more preferred phthalic anhydride bottoms starting composition as shown in Table I.

To a three-liter, four-neck, round-bottom flask equipped with a stirrer, thermometer, nitrogen inlet tube, and a goose-neck condenser, there is added at ambient temperature and pressure 740 grams (about 3 moles) of the above phthalic anhydride bottoms in a pulverized form followed by 1060 grams (about 10 moles) of diethylene glycol. The mixture is heated to 220° C. and kept at this temperature until the acid number of the reaction mixture is found to be not more than about 7.0, and then sufficient diethylene glycol is removed from the reaction zone to achieve the final product hydroxyl and viscosity values. The reaction product is an ester polyol composition which, when cooled to room temperature, is a black liquid that is found to have an hydroxyl number of about 312 and a viscosity of about 25,000 centipoises at 25° C. measured using a Brookfield viscometer (model RVF) with a #6 spindle operating at about 10 rpm. Details for this Example are summarized in Table VI below.

TABLE VI

Summary of Examples 1–8

| | Reactants | | Process Conditions | | Product Characteristics[1] | | |
|---|---|---|---|---|---|---|---|
| Example Number | Wt. of Phthalic Anhydride Bottoms (grams) | Wt. of Diethylene Glycol (grams) | Reaction Temp. (°C.) | Reaction Time (hrs) | Acid Number | Hydroxyl Number | Viscosity CPS at 25° C. |
| 1 | 740 | 1060 | 220 | 11.0 | 7.0 | 312 | 25,000 |
| 2[(2)] | 740 | 1060 | 220 | 5.0 | 0.5 | 226 | 61,000 |
| 3[(2)] | 740 | 1060 | 220 | 4.0 | 5.5 | 215 | 137,000 |
| 4 | 725 | 1060 | 195 | 9.5 | 6.0 | 324 | 9,000 |
| 5 | 745 | 1060 | 195 | 15.0 | 4.5 | 310 | 6,000 |
| 6 | 743 | 1060 | 220 | 4.5 | 1.0 | 300 | 8,000 |
| 7 | 746 | 1061 | 239 | 4.0 | 5.0 | 335 | 4,800 |
| 8 | 750 | 1074 | 240 | 3.5 | 2.5 | 390 | 4,000 |

Table VI Footnotes:
[(1)]In each example, the product ester polyol composition is believed to be comprised of components at least 50 weight percent (on a 100 weight percent total composition basis) of which have aromatic nuclei, and at least two terminal hydroxyl groups per molecule, and at least two ester groups per molecule. In each example, the product ester polyol composition is believed to contain from about 2 to 30 weight percent (on a 100 weight percent product basis) of excess unreacted residual diethylene glycol. In general, for a given product, the lower the content of residual diethylene glycol, the lower the hydroxyl number and the higher the viscosity thereof.
[(2)]100 parts per million based upon total charge of stannous octoate added as an esterification catalyst in these examples.

EXAMPLES 2–8

The procedure of Example 1 is repeated using different conditions to prepare various product ester polyol compositions. The details including weight of charges, reactant ratios, and product characteristics are summarized in Table VI above. The reaction product in each instance is believed to contain diethylene glycol phthalate.

Each of the products of Examples 1–8 is reactive with isocyanates to produce polyurethane and polyisocyanurate foam products.

EXAMPLE 9

The phthalic anhydride bottoms composition of Example 1 is reacted with 1,1,1-trimethylolpropane as follows:

To a 5 liter, four-neck, round-bottom flask equipped with a stirrer, thermometer, nitrogen inlet tube, and a goose-neck condenser, there is added 1480 grams (about 6 moles) of phthalic anhydride bottoms and 2680 grams (20 moles) of trimethylolpropane. The mixture is heated to 190° C. with stirring and kept at this temperature until the acid number is 5. The reaction product (an ester polyol composition) is then cooled to room temperature and analyzed. The hydroxyl number is found to be 565.2. The black product is a gel-like material at 25° C. which contains compounds with the structural formula:

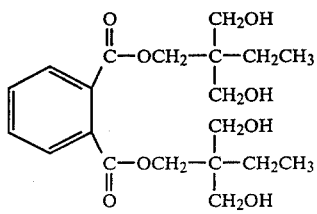

At least 50 weight percent of such product (100 weight percent total basis) is believed to comprise compounds which have an aromatic nucleus and which contain at least 2 hydroxyl groups per molecule. This reaction product is believed to contain from about 2 to 15 weight percent of the unreacted trimethylolpropane.

This product is suitable for formulating with blowing agents, catalysts, and other polyols for reaction with isocyanates to produce useful foams.

EXAMPLE 10

For comparison purposes, a substantially pure diethylene glycol phthalate diester diol is prepared as follows:

Phthalic anhydride believed to be of 99.7 weight percent purity (total composition basis) having a hydroxyl number of about 0 and an acid number of about 750 is obtained and 746 grams thereof (about 5 moles) is charged to a three-liter, four-neck, round-bottom flask equipped with a stirrer, thermometer, nitrogen inlet tube, and a goose-neck condenser at ambient temperature and pressure, followed by 1060 grams (about 10 moles), of diethylene glycol. This mixture is heated to 239° C. and kept at this temperature until the acid number of the reaction mixture is found to be about 2.9 (about 4 hours). The reaction product is believed to comprise diethylene glycol phthalate and is in the form of a pale yellow liquid at room temperature having an hydroxyl number of about 323 and a viscosity of about 2500 centipoises at 25° C. [measured using a Brookfield viscometer (model RVF) with a #6 spindle operating at about 10 rpm]. The reaction product has a saponification value of 319, an ester value of 316, and an unknown acetone insolubles content of 4.24 weight percent (100 weight percent total product basis). This reaction product also contains about 13.1 weight percent (total weight basis) of diethylene glycol.

EXAMPLE 11 (A,B,C,D,E)

Samples identified as A, B, C, and D of the ester polyol of Example 1, and a sample identified as E of Example 10, are each blended with various of the ingredients shown in Table VII below to produce resin blends. Then a portion of each respective resin blend is admixed using a high speed drill press motor equipped with a stirrer blade with a polymeric isocyanate (polymethylene polyphenylisocyanate), Mondur MR from Mobay Chemical Co., to produce a polyurethane-polyisocyanurate type foam.

The product foam produced in each case is characterized by a very fine cell structure with minimal surface friability and high load bearing properties which is considered surprising in the case of the foams made with the resin blends A, B, C, and D that are derived from a product ester polyol composition of this invention. The compositions used are summarized in Table VII below.

The product foam from resin blend E contains only the diethylene glycol phthalate of Example 10. This product foam is similar in its properties to the product foam from the resin blend A which, like the resin blend E, is believed to contain very little diethylene glycol. In order to dissolve the fluorocarbon blowing agent ("Freon 11B") in each of the resin blends A and E, it is necessary to use more ethoxylated octyl phenol ("Triton X-100") than is needed to dissolve the same fluorocarbon blowing agent in each of the resin blends B, C, and D which each contain diethylene glycol. The ethoxylated octyl phenol and the diethylene glycol may function as compatibility agents in these resin blends.

TABLE VII

| Component | Resin Blend Formulation | | | | |
| --- | --- | --- | --- | --- | --- |
| | A | B | C | D | E |
| Ester Polyol, Example 1 | 32.6 | 29.4 | 46.0 | 42.6 | — |
| Ester Polyol, Example 9 | — | — | — | — | 34.0 |
| Diethylene glycol | — | 5.2 | 2.4 | 5.8 | — |
| "DC-193"[1] | 2.0 | 2.0 | 2.6 | 2.6 | 2.0 |
| "Triton X-100"[2] | 14.7 | 12.7 | — | — | 13.0 |
| "Antiblaze 80"[3] | 12.6 | 12.6 | — | — | 14.0 |
| "DABCO TMR-2"[4] | 2.0 | 2.0 | — | — | 2.0 |
| "DMP-30"[5] | 0.5 | 0.5 | — | — | 1.0 |
| "Catalyst T-45"[6] | 1.5 | 1.5 | — | — | — |
| "Freon 11B"[7] | 34.1 | 34.1 | 31.5 | 31.5 | 34.0 |
| "Curithane 97"[8] | — | — | 5.4 | 5.4 | — |
| "Varonic K-215"[9] | — | — | 12.1 | 12.1 | — |
| Weight Ratio A/B[10] | 60/40 | 60/40 | 60/40 | 58.1/41.9 | 60/40 |
| Density, pcf | 2.10 | 2.23 | 1.7 | 1.8 | 1.86 |

Table III footnotes:
[1]"DC-193" is a trademark for dimethylpolysiloxane, polyalkylene oxide copolymer available commercially from Dow Corning.
[2]"Triton X-100" is a trademark for ethoxylated octylphenol available commercially from Rohm and Haas believed to contain about 10-15 combined moles of ethylene oxide per molecule.
[3]"Antiblaze 80" is a trademark for tris (B-chloropropyl)-phosphate available commercially from Mobil Chemical Company.
[4]"DABCO TMR-2" is a trademark for polyisocyanurate catalyst available commercially from Air Products Company.
[5]"DMP-30" is a trademark for 2,4,6-tri(dimethylaminomethyl) phenol available commercially from Rohm and Haas.
[6]"Catalyst T-45" is a trademark for 50% potassium octoate in dipropylene glycol available commercially from M & T Chemicals.
[7]"Freon 11B" is a trademark for trichlorofluoromethane available commercially from E. I. duPont de Nemours and Company.
[8]"Curithane 97" is a trademark for polyisocyanurate catalyst available commercially from Upjohn Company.
[9]"Varonic K-215" is a trademark for ethoxylated cocoamine available commercially from Sherex Chemical Company.
[10]This ratio designates the weight ratio of isocyanate (designated as "A") to the weight ratio of resin formulation containing polyol product of Example 1 (designated as "B").

The resin blends B, C, and D are easier to produce compared to the blends A and E apparently because the presence of the diethylene glycol in the case of blends B, C, and D aids in the blending operation.

When combined with the isocyanate, each of the resin blends B, C, and D exhibits a shorter initial cream time and a shorter tack free time than do the respective resin blends A and E for comparable catalyst quantities.

Considering each of the product foams produced, those foams resulting from resin blends B, C, and D appear to have a better blush and less friability than do those foams resulting from resin blends A and E.

The hydroxyl number of each of the resin blends B, C, and D is greater than the hydroxyl number of each of the resin blends A and E which is believed to be a consequence of the presence of the higher concentration of diethylene glycol in such resin blends B, C, and D.

By changing the weight ratio of isocyanate to resin formulations from those shown in Table VII to a value of about 50/50, product polyurethane-type foams of each such resin blend A through E are produced. Each product foam likewise has a very fine cell structure with minimal surface friability and high load bearing properties.

Each of the products of Examples 2–8 (see Table V) when similarly prepared and reacted with an isocyanate produces polyurethane and polyisocyanurate foam products.

EXAMPLE 12

A heated specimen of a phthalic anhydride bottoms composition having (a) a phthalic anhydride content of about 60 weight percent (total composition basis), (b) a hydroxyl number estimated to be about zero, and (c) an acid number estimated to be about 500 is charged to a 60 gallon stainless steel reactor equipped with an agitator, thermocouple for measuring temperature, nitrogen inlet tube, and a distillation column. To the reactor is added at ambient pressure 148 pounds (about 1 pound mole) of such above-identified phthalic anhydride bottoms and 328 pounds (about 3.09 pound mole) of diethylene glycol. The mixture is heated to 223° C. and kept at this temperature until the acid number of the reactant mixture is found to be about 5.5 (about 14 hours). The reaction product (an ester polyol composition) is then cooled to ambient temperature, and hydroxyl number, and viscosity values thereof are determined. The hydroxyl number is found to be about 329, and the viscosity of the black liquid product is found to be about 15,500 centipoises at 25° C. measured using Brookfield viscometer (model RVF) with a #6 spindle at a speed of 10 rpm. Ester polyol composition being characterized by containing organic compounds at least 50 weight percent (on a 100 weight percent total composition basis) of which have aromatic nuclei, at least two terminal hydroxyl groups per molecule, and at least two ester groups per molecule. This reaction product is believed to contain about 10.6 weight percent (total composition basis) of unreacted diethylene glycol. In addition, this reaction product had a content of unknown acetone insolubles of about 35 weight percent (total composition basis) and a saponification value of about 380 (both measured as described in footnotes of Table IV above).

This product behaves similarly to the product of Example 1 with respect to its foam forming characteristics.

EXAMPLE 13

A heated specimen of a phthalic anhydride bottoms composition having (a) a phthalic anhydride content of about 60 weight percent (total composition basis), (b) a hydroxyl number estimated to be about zero, and (c) an acid number estimated to be about 500 is charged to a 60 gallon stainless steel reactor equipped with an agitator, thermocouple for measuring temperature, nitrogen inlet tube, and a distillation column. To the reactor is added at ambient pressure 229 pounds (about 1 pound mole) of such above-identified phthalic anhydride bottoms and 305 pounds (about 2.88 pound mole) of diethylene glycol. The mixture is heated to 225° C. and kept at this temperature until the acid number of the reactant mixture is found to be about 4 (about 15 hours). The reaction product (an ester polyol composition) is then cooled to ambient temperature, and hydroxyl number, and viscosity values thereof are determined. The hydroxyl number is found to be about 320, and the viscosity of the black liquid product is found to be about 16,800 centipoises at 25° C. measured using a Brookfield viscometer (model RVF) with a #6 spindle at a speed of 10 rpm. The ester polyol composition is characterized by containing organic compounds at least 50 weight percent (on a 100 weight percent total composition basis) of which have (A) aromatic nuclei, (B) at least two terminal hydroxyl groups per molecule, and (C) at least two ester groups per molecule. The reaction product is believed to contain about 15.8 weight percent (total composition basis) of unreacted diethylene glycol. In addition, this reaction product had a content of unknown acetone insolubles of about 15.6 weight percent (total composition basis) and a saponification value of about 317 (both measured as described in footnotes of Table IV above).

This product behaves similarly to the product of Example 1 with respect to its foam forming characteristics.

The products of Examples 1–8, and 11–13 are analyzed further, and the combined results are shown in Table VIII below. Liquid chromatographic analysis confirms the qualitative similarity between the respective compositions of Examples 1–9 and 11–13.

When other polyols of formula (1), such as ethylene glycol, tetraethylene glycol, glycerine, pentaerythritol, and 2,2-dimethyl-1,3,-propane diol, are reacted with a starting phthalic anhydride bottoms composition, product ester polyol compositions are produced which can be formulated with blowing agent and catalyst to produce resin blends that can then be reacted with isocyanate to produce useful foams.

Having now fully described the invention, it will be apparent to one of ordinary skill in the art that many changes and modifications can be made thereto without departing from the spirit or scope of the invention as set forth herein.

TABLE VIII

| Ident. No. | Component or Property | Magnus Polyol of Example No. | | | | | | | | | | |
|---|---|---|---|---|---|---|---|---|---|---|---|---|
| | | 1 | 2 | 3 | 4 | 5 | 6 | 7 | 8 | 9 | 12 | 13 |
| 1 | diethylene glycol content (wt %) | 15.6 | 3.4 | 6.6 | 16.5 | 13.9 | 12.7 | 19.6 | 19.0 | — | 10.6 | 15.8 |
| 2 | hydroxyl number | 312 | 226 | 215 | 324 | 310 | 300 | 335 | 390 | 565.2 | 329 | 320 |
| 3 | acid number | 7.0 | 0.5 | 5.5 | 6.0 | 4.5 | 1.0 | 5.0 | 2.5 | — | 5.5 | 4.4 |
| 4 | saponification number | 323 | 365 | 323 | 302 | 304 | 321 | 298 | 306 | — | 380 | 317 |
| 5 | ester value[1] | 316 | 364.5 | 317.5 | 296 | 299.5 | 320 | 293 | 303.5 | — | 374.5 | 312.6 |
| 6 | unknown acetone insolubles content (wt %) | 18.2 | 24.3 | 11.3 | 11.7 | 7.2 | 14.7 | 12.2 | 11.1 | 10–20 | 35.0 | 15.6 |
| 7 | viscosity, cps | 25000 | 61000 | 137000 | 9000 | 6000 | 8000 | 4800 | 4000 | — | 15000 | 16800 |
| 8 | 1,1,1-trimethylol propane content (wt %) | — | — | — | — | — | — | — | — | 2–15 | — | — |

TABLE VIII-continued

| Ident. No. | Component or Property | Magnus Polyol of Example No. | | | | | | | | | | |
|---|---|---|---|---|---|---|---|---|---|---|---|---|
| | | 1 | 2 | 3 | 4 | 5 | 6 | 7 | 8 | 9 | 12 | 13 |
| 9 | mole ratio of bottoms to polyol[2] | 1:3.1 | 1:3.1 | 1:3.1 | 1:3.1 | 1:3.1 | 1:3.1 | 1:3.1 | 1:3.1 | 1:3.1 | 1:3.3 | 1:3.3 |

Table VIII footnotes:
[1] The term "ester value" references the number of milligrams of potassium hydroxide needed to react with the ester groups present in one gram of sample minus the number of milligrams of potassium hydroxide required to neutralize the acid material present in one gram of sample.
[2] The term "mole ratio of bottoms to polyol" references the calculated molar quantity of carboxylic compounds to formula (1) polyol molar quantity in any given example. The carboxylic compounds are assumed to be a 50/20 ratio of phthalic anhydride to trimellitic anhydride.

I claim:
1. An ester polyol composition characterized by:
(A) containing on a 100 weight percent total composition basis—
(1) from about 2 to 35 weight percent of at least one polyol of the formula:

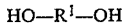
HO—R¹—OH wherein
R' is a divalent radical selected from the group consisting of:
(a) alkylene radicals each containing from 2 through 6 carbon atoms
(b) radicals of the formula:

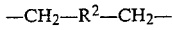
—CH₂—R²—CH₂—

R² is a radical selected from the group consisting of:

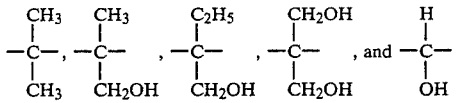

(c) radicals of the formula:

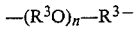
—(R³O)ₙ—R³—

R³ is an alkylene radical containing from 2 through 3 carbon atoms, and
n is an integer of from 1 through 3,
(2) from about 7.0 to 45 weight percent of acetone insolubles,
(3) from about 40 to 85 weight percent of esters produced by the reaction of phthalic anhydride with said polyol,
(B) having an hydroxyl number ranging from about 190 to 600,
(C) having an acid number ranging from about 0.01 to 7,
(D) having a saponification value ranging from about 295 to 425,
(E) having a viscosity ranging from about 10,000 to 150,000 centipoises at 25° C. measured with a Brookfield viscometer with a #6 spindle operating at about 10 rpm,
said ester polyol composition having been produced by the process of contacting a phthalic anhydride bottoms composition with at least one said polyol,
(A') said phthalic anhydride bottoms composition being characterized by containing on a 100 weight percent total basis:
(1) from about 50 to 95 weight percent of phthalic acid anhydride,
(2) from about 1 to 20 weight percent of at least one compound selected from the group consisting of trimellitic acid and trimellitic acid anhydride, and
(3) from about 3 to 40 weight percent of unknown acetone insolubles, and by having
(4) an acid number ranging from about 380 to 750, and
(5) an hydroxyl number of substantially zero,
(B') the initial mole ratio of said polyol to said phthalic anhydride bottoms composition ranging from about 2 to 4 based on an estimate of the total carboxylic acid and carboxylic acid anhydride content of said phthalic anhydride bottoms composition,
(C') said contacting being done while maintaining:
(1) liquid phase reaction conditions,
(2) a temperature ranging from about 190° to 250° C., and
(D') said contacting being continued until:
(1) the hydroxyl number of the resulting mixture reaches a value ranging from about 190 to 600, and
(2) the acid number of the resulting mixture reaches a value ranging from about 0.01 to 7.
2. An ester polyol composition characterized by:
(A) containing on a 100 weight percent total composition basis—
(1) from about 8 to 30 weight percent of unreacted, diethylene gylcol,
(2) from about 7.0 to 35 weight percent of acetone insolubles,
(3) from about 50 to 85 weight percent of esters produced by the reaction of phthalic anhydride with said diethylene glycol
(B) having an hydroxyl number ranging from about 270 to 450,
(C) having an acid number ranging from about 2 to 6,
(D) having a saponification value ranging from about 350 to 400,
(E) having a viscosity ranging from about 25,000 to 100,000 centipoises at 25° C. measured with a Brookfield viscometer with a #6 spindle operating at about 10 rpm,
said ester polyol composition having been produced by the process of contacting a phthalic anhydride bottoms composition with diethylene glycol,
(A') said phthalic anhydride bottoms composition being characterized by containing on a 100 weight percent total basis:
(1) from about 50 to 95 weight percent of phthalic acid anhydride,
(2) from about 1 to 20 weight percent of at least one compound selected from the group consisting of trimellitic acid and trimellitic acid anhydride, and
(3) from about 3 to 40 weight percent of unknown acetone insolubles, and by having (4) an acid number ranging from about 380 to 750, and
(5) an hydroxyl number of substantially zero,
(B') the initial mole ratio of said diethylene glycol to said phthalic anhydride bottoms composition ranging from about 2 to 4 based on an estimate of the total carboxylic acid and carboxylic acid anhydride component of said phthalic anhydride bottoms composition,
(C') said contacting being done while maintaining:
  (1) liquid phase reaction conditions,
  (2) a temperature ranging from about 190° to 250° C., and
(D') said contacting being continued until:
  (1) the hydroxyl number of the resulting mixture reaches a value ranging from about 270 to 450, and
  (2) the acid number of the resulting mixture reaches a value ranging from about 2 to 6.

3. An ester polyol composition characterized by:
(A) containing on a 100 weight percent total composition basis—
  (1) from about 2 to 35 weight percent of diethylene glycol,
  (2) from about 7.0 to 45 weight percent of acetone insolubles,
  (3) from about 40 to 85 weight percent of esters produced by the reaction of phthalic anhydride with said diethylene glycol,
(B) having an hydroxyl number ranging from about 190 to 600,
(C) having an acid number ranging from about 0.01 to 7,
(D) having a saponification value ranging from about 295 to 425,
(E) having a viscosity ranging from about 10,000 to 150,000 centipoises at 25° C. measured with a Brookfield viscometer with a #6 spindle operating at about 10 rpm,
said ester polyol composition having been produced by the process of contacting a phthalic anhydride bottoms composition with said diethylene glycol,
(A') said phthalic anhydride bottoms composition being characterized by containing on a 100 weight percent total basis:
  (1) from about 50 to 95 weight percent of phthalic acid anhydride,
  (2) from about 1 to 20 weight percent of at least one compound selected from the group consisting of trimellitic acid and trimellitic acid anhydride, and
  (3) from about 3 to 40 weight percent of unknown acetone insolubles,
and by having
  (4) an acid number ranging from about 380 to 750, and
  (5) an hydroxyl number of substantially zero,
(B') the initial mole ratio of said diethylene glycol to said phthalic anhydride bottoms composition ranging from bout 2 to 4 based on an estimate of the total carboxylic acid and carboxylic acid anhydride content of said phthalic anhydride bottoms composition,
(C') said contacting being done while maintaining:
  (1) liquid phase reaction conditions,
  (2) a temperature ranging from about 190° to 250° C., and
(D') said contacting being continued until:
  (1) the hydroxyl number of the resulting mixture reaches a value ranging from about 190 to 600, and
  (2) the acid number of the resulting mixtures reaches a value ranging from about 0.01 to 7.

* * * * *